United States Patent
Rüchardt et al.

(10) Patent No.: US 10,520,047 B2
(45) Date of Patent: Dec. 31, 2019

(54) METHOD FOR WARMING-UP A PNEUMATIC CLUTCH ACTUATOR

(71) Applicant: ZF Friedrichshafen AG, Friedrichshafen (DE)

(72) Inventors: Christoph Rüchardt, Bodolz (DE); Thomas Jäger, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/218,537

(22) Filed: Dec. 13, 2018

(65) Prior Publication Data
US 2019/0186562 A1 Jun. 20, 2019

(30) Foreign Application Priority Data
Dec. 18, 2017 (DE) .................. 10 2017 223 046

(51) Int. Cl.
*F16D 48/06* (2006.01)
*F16D 25/12* (2006.01)

(52) U.S. Cl.
CPC ............. *F16D 48/06* (2013.01); *F16D 25/12* (2013.01); *F16D 2500/1028* (2013.01); *F16D 2500/302* (2013.01); *F16D 2500/70436* (2013.01); *F16D 2500/7109* (2013.01)

(58) Field of Classification Search
CPC ............. F16D 48/06; F16D 2500/1028; F16D 2500/302; F16D 2500/3121; F16D 2500/501; F16D 2500/511; F16D 2500/70454
See application file for complete search history.

(56) References Cited

U.S. PATENT DOCUMENTS

| 5,131,293 A | 7/1992 | Kaiser et al. |
| 6,285,940 B1 | 9/2001 | Henneken et al. |

(Continued)

FOREIGN PATENT DOCUMENTS

| DE | 39 28 814 A1 | 3/1991 |
| DE | 10 2009 045 090 A1 | 3/2011 |

(Continued)

OTHER PUBLICATIONS

German Search Report Corresponding to 10 2017 223 046.0 dated May 2, 2018.

*Primary Examiner* — Edwin A Young
(74) *Attorney, Agent, or Firm* — Davis & Bujold PLLC; Michael J. Bujold

(57) ABSTRACT

A method for controlling a pneumatic actuator (1) of a transmission having at least one sealing element (6, 7), arranged between two elements (2, 3) of the clutch actuator (1) that move relative to one another, and within a specifiable operating temperature range in which leakproofness of the clutch actuator (1) is ensured. The clutch actuator (1) is acted upon with compressed air from an air supply system for actuating a shifting and/or starting clutch arranged between a drive aggregate and a transmission. In order to warm up the clutch actuator (1), if a temperature of the clutch actuator (1) is lower then a glass transition temperature of the at least one sealing element (6, 7), the drive aggregate is operated at a higher rotational speed compared to the idling speed of the drive aggregate.

10 Claims, 2 Drawing Sheets

(56) References Cited

U.S. PATENT DOCUMENTS

| | | | | |
|---|---|---|---|---|
| 2009/0218190 A1* | 9/2009 | Reuschel | ............ | F16D 25/088 |
| | | | | 192/85.63 |
| 2014/0076086 A1* | 3/2014 | Wascheul | ............ | F16H 63/3023 |
| | | | | 74/473.11 |
| 2014/0238809 A1* | 8/2014 | Boyes | ................ | F02B 67/06 |
| | | | | 192/75 |

FOREIGN PATENT DOCUMENTS

| | | |
|---|---|---|
| DE | 10 2015 200 682 A1 | 7/2016 |
| EP | 1 015 797 B1 | 7/2000 |

\* cited by examiner

METHOD FOR WARMING-UP A PNEUMATIC CLUTCH ACTUATOR

This application claims priority from German patent application serial no. 10 2017 223 046.0 filed Dec. 18, 2017.

FIELD OF THE INVENTION

The invention relates to a method for warming up a pneumatic clutch actuator of a transmission. In addition, the invention relates to a control unit for carrying out the method and to a corresponding computer program product.

BACKGROUND OF THE INVENTION

From practice automatic or automated transmissions having a pneumatically or hydraulically actuated automated clutch, in particular a pneumatically or hydraulically actuated starting clutch are known, wherein the clutch of the transmission is actuated to open and to close by a pneumatic or hydraulic clutch actuator. Such a clutch actuator has an actuating cylinder which is coupled to the clutch, and control valves associated with the actuating cylinder of the clutch actuator, and depending on their switched position these valves either fill or empty the actuating cylinder. The control valves of the clutch actuator are controlled by a control unit.

A clutch arranged in the drive-train of a motor vehicle between a drive motor, for example in the form of an internal combustion engine, and a manual transmission, serves during traction operation to transmit a torque from the drive motor to the manual transmission; during overdrive operation it also acts in the reverse direction. In its non-activated condition the clutch is fully closed by the action of a pressure spring, and transmits the torque without slip by virtue of static friction. In starting processes, shifting processes and emergency braking the clutch is opened and the power flow between the drive motor and the manual transmission is therefore temporarily interrupted or at least reduced.

In a starting process, when a starting gear has been engaged the clutch is closed again continuously, whereby the torque of the drive motor is transmitted in slipping operation by sliding friction, and thereby a rotational speed equalization takes place between the drive output shaft of the rapidly rotating drive motor and the initially static and then at first more slowly rotating input shaft of the manual transmission. In a shifting process between an engaged, loaded gear and a target gear to be engaged, opening of the clutch enables the loaded gear to be disengaged while free from bad and thereafter enables the bad-free synchronization and engagement of the target gear. During emergency braking, opening the clutch allows the drive force of the drive motor to be taken up by the drive wheels.

From DE 10 2009 045 090 A1 a method for operating an automated clutch is known. During the operation of the transmission, if defined operating conditions occur, such as the temperature falling below a limiting temperature value, the leakproofness of a clutch actuator serving to operate the clutch is checked. On the basis of that check it can then be decided whether, and if needs be under which conditions further operation of the clutch is permissible.

It is very important that the clutch actuator that serves to actuate the clutch should operate in a leakproof manner. Thus, leakproofness of the clutch actuator is vital for the correct operation of the clutch or its clutch actuator. Typically an operating temperature range is defined, within which the clutch actuator must have a specified leakproofness, whereas outside this defined operating temperature range operation of the clutch actuator and hence operation of the clutch are not permitted.

SUMMARY OF THE INVENTION

The purpose of the present invention is to provide a new type of method for warming up a pneumatic clutch actuator, by virtue of which a shorter warm-up phase at low temperatures can be achieved. In addition a control unit designed to carry out the method and a computer program product for carrying out the method are indicated.

From the process-technological standpoint this objective is achieved with the characterizing features of the independent claims. In addition, a control unit for a computer program product for operating a motor vehicle are further objects of the claims. Advantageous further developments are the object of the subordinate claims and of the description that follows.

A method is proposed for the control of a pneumatic clutch actuator of a transmission, wherein at least one sealing element is arranged between two elements of the clutch actuator that can move relative to one another.

The transmission is preferably a multi-gear transmission in which a number of transmission steps, i.e. fixed gear ratios, can be engaged between two shafts of the transmission by means of shifting elements, preferably in an automated manner. Such transmissions are used mainly in motor vehicles, in particular also in utility vehicles, in order to adapt suitably the rotational speed and torque output characteristic of the drive aggregate to the driving resistance of the vehicle.

The clutch actuator can be in the form of a piston-cylinder unit, with at least one sealing element arranged between the piston and the cylinder. The piston is arranged to move axially relative to the cylinder of the piston-cylinder unit. The sealing element can be, for example, in the form of a rectangular sealing ring or an O-ring seal.

The pneumatic clutch actuator of the transmission serves to open and close a shifting and/or starting clutch arranged between a drive aggregate and the transmission, and can for example be in the form of a central release device. When designed as a central release device it is usually in the form of a piston-cylinder unit arranged concentrically with a transmission input shaft.

Within a specifiable operating temperature range that ensures that the clutch actuator is leakproof, the clutch actuator is acted upon with compressed air from an air supply system for actuating the shifting and/or starting clutch. The air supply system can for example comprise an air compressor as well as pressure medium lines and control or regulating valves designed as inlet or outlet valves for actuating the clutch actuator. The air compressor can be a compressor already present in a motor vehicle in which the transmission is fitted.

The invention, now, is based on the technical principle that to warm up the clutch actuator if a temperature of the clutch actuator is lower than a glass transition temperature of the at least one sealing element, the drive aggregate is operated at a rotational speed higher than the idling speed of the drive aggregate.

Thus, during the warming-up process of the clutch actuator the drive aggregate can be operated at a rotational speed which, having regard to the temperature of the drive aggregate, is the maximum permissible speed.

The maximum permissible rotational speed of the drive aggregate can be understood to mean a speed of the drive aggregate which, if exceeded, would cause the drive aggregate to be damaged. However, the maximum permissible rotational speed of the drive aggregate can also be understood to mean a rotational speed of the drive aggregate which is lower by a specifiable offset than the speed that would cause damage to the drive aggregate.

Pneumatic sealing elements, when their temperature falls below a so-termed glass transition temperature, also called the glass temperature, lose their effectiveness as seals. The glass transition temperature can for example be within a temperature range between −15° C. to −20° C., preferably at a temperature of −18° C. in the temperature range below the glass transition temperature the sealing element is in a hard-elastic, glasslike, brittle condition in which the sealing element no longer fulfills its sealing function.

Without additional measures the necessary warming process of the clutch actuator takes a lot of time, during which the transmission and hence the motor vehicle cannot be used. By virtue of the method according to the present invention the warming of the pneumatic sealing element to a temperature above the glass transition temperature can be considerably accelerated, since the warming is influenced actively.

The clutch actuator, for example, co-operates via a release bearing with a pressure plate of the shifting and/or starting clutch, which rotates at the rotational speed of the drive aggregate. At higher rotational speeds of the drive aggregate the release bearing in contact with the pressure plate is heated more, and so too therefore is the clutch actuator by the waste heat released.

When the temperature of the clutch actuator, or the temperature of the at least one sealing element arranged between the two elements of the clutch actuator that move relative to one another, exceeds the glass transition temperature, the elevated rotational speed of the drive aggregate can be reduced again. When the glass transition temperature has been reached or exceeded, the clutch actuator is leakproof and the clutch actuator is then ready for use. Consequently, the warming-up process can be terminated.

In other words, compressed air is already flowing through the clutch actuator from the air supply system when the temperature of the clutch actuator or the temperature of the sealing element is still outside the defined operating temperature range and due to the lower temperatures the clutch actuator is not leakproof and cannot therefore be operated properly. By acting upon the clutch actuator with preheated compressed air from the air supply system, the clutch actuator and hence the sealing element of the clutch actuator are warmed up. This can take place during a warm-up running phase of the transmission or the motor vehicle.

In an advantageous further development it is provided that the compressed air passing into the clutch actuator is preheated in a through-flow heater arranged in the air supply system. In that way the temperature of the air passing into the actuator can be raised more rapidly and the time needed for warming the actuator or its sealing element is correspondingly made shorter. By the through-flow heater the compressed air passing into the actuator can be warmed, for example, by a cooling water circuit of the drive aggregate, or electrically. The drive aggregate of the motor vehicle can be in the form of a combustion engine or internal combustion engine, an electric motor or a hybrid drive comprising an internal combustion engine and an electric motor.

When the temperature of the clutch actuator or the temperature of the sealing element exceeds the glass transition temperature of the sealing element, then the supply of compressed air from the air supply system can be discontinued again since the clutch actuator is then leakproof again and the clutch actuator is thus ready for use again.

The inflow of compressed air from the air supply system during the warm-up process is preferably also discontinued when a maximum permissible switched-on duration of electro-pneumatic switching valves of the air supply system is reached. This protects the switching valves against excessive heating of the valve solenoids.

In an advantageous further development it is provided that for the control of the electro-pneumatic switching valves individual pulses are emitted with a specifiable constant or variable pulse frequency. With reference to the pulse frequency with which at least one inlet valve of the air supply system is activated for actuating the clutch actuator, and a determination of the position of the clutch actuator during the application of pressure, the degree of leakproofness of the actuator or its sealing element can be deduced. That information can be used in addition for determining the time at which the warm-up process should be discontinued.

The invention also relates to a control unit designed to carry out the method according to the invention. The control unit comprises means that serve to implement the method according to the invention. These means include hardware means and software means. The hardware means of the control unit are data interfaces for the exchange of data with the assemblies of the drive-train involved in carrying out the method according to the invention. For that purpose the control unit is also connected to the necessary sensors and, if needs be, also to other control units such as an engine control unit, in order to receive the decision-relevant data and to pass on control commands. Thus for example, the control unit can communicate with the engine control unit and, from it, call for the drive aggregate to be operated at a higher rotational speed during the warming-up of the clutch actuator. The control unit can for example be a transmission control unit. The hardware means of the control unit also include a processor for data processing and if necessary a memory for data storage. The software means consist of program modules for implementing the method according to the invention.

The system according to the invention can also be embodied as a computer program product which, when it runs on a processor of a control unit, instructs the processor by software means to carry out the associated process steps that are objects of the invention. In this connection a computer-readable medium is also an object of the invention, on which medium the computer program product described above can be retrievably stored.

The invention is not limited to the combination of features indicated in the independent claims or the claims that depend on them. There are also possibilities for combining individual features with one another, provided that they emerge from the claims, the description of embodiments given below, or directly from the figures.

BRIEF DESCRIPTION OF THE DRAWINGS

Preferred further developments emerge from the subordinate claims and the following description. An example embodiment of the invention, to which it is not limited, is explained in greater detail with reference to the drawing, which shows:

DETAILED DESCRIPTION OF THE PREFERRED EMBODIMENTS

Figure 1:
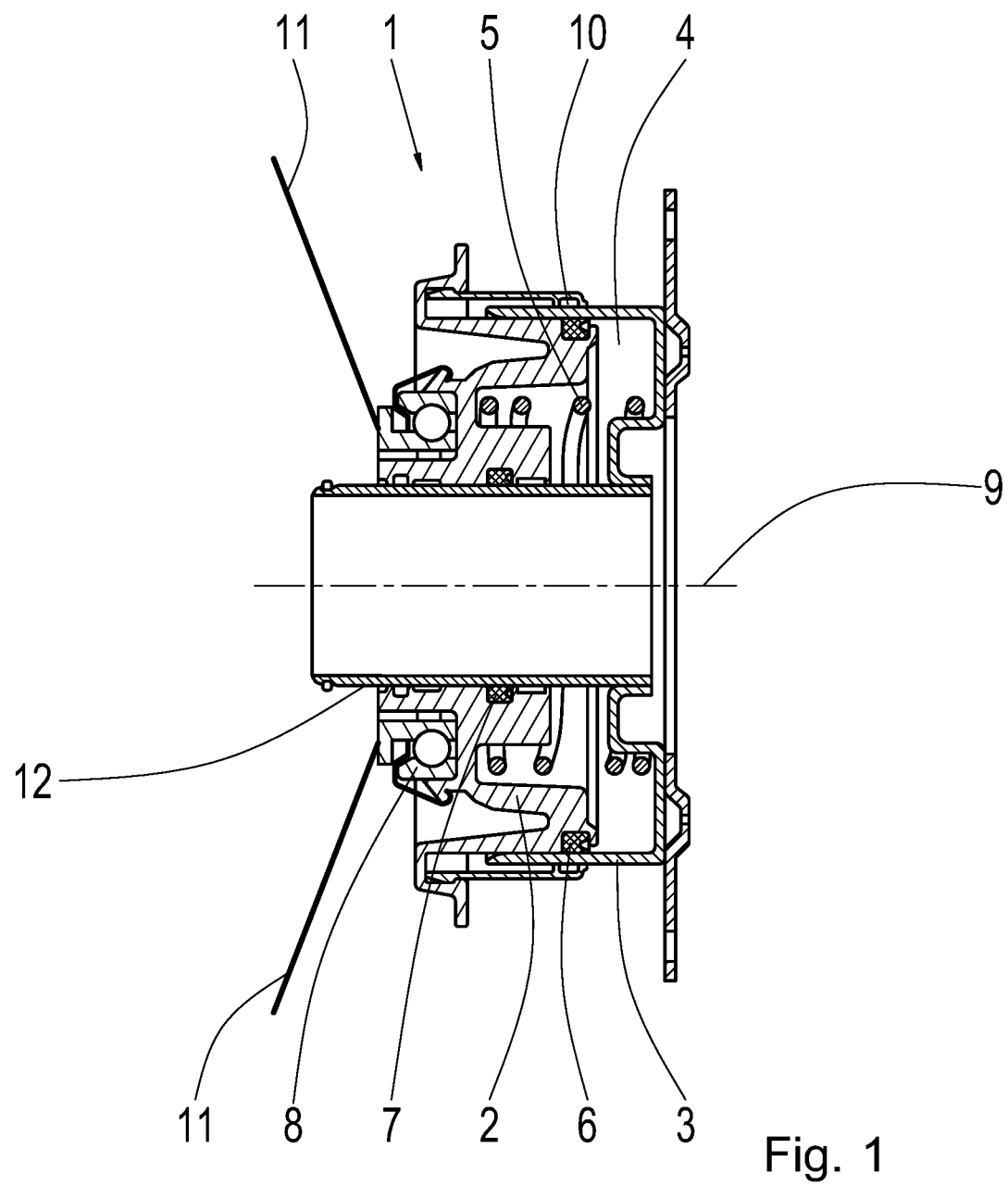
FIG. 1: A pneumatic clutch actuator of a transmission.

FIG. 1 shows a pneumatic clutch actuator 1 for opening and closing a shifting and/or starting clutch in the form of a central release device arranged between a drive aggregate and a transmission. In this case the clutch actuator 1 comprises a cylinder 3 with an annular cylinder body. In the cylinder 3 is arranged a piston 2 that can move axially along a rotational axis 9 of the shifting and/or starting clutch on a guide-tube 12. The piston 2 is in the form of an annular piston and carries a release bearing 8, which co-operates with a pressure plate 11 of the shifting and/or starting clutch. The pressure plate 11 can for example be in the form of a membrane spring.

Between the piston 2 and the cylinder 3 is arranged an outer sealing element 6 and between the piston 2 and the guide-tube 12 is arranged an inner sealing element 7. In this case the sealing elements 6, 7 are in the form of elastomer groove rings.

Furthermore, between the piston 2 and the cylinder 3 is arranged a spring 5, which pushes the piston 2 away from the cylinder 3 and therefore applies a defined load on the piston 2 and the release bearing 8, without the clutch actuator 1 being acted upon by compressed air. Accordingly, the spring 5 is also called a pre-load spring.

The position of the piston 2 can be detected by a path sensor 10. To detect the temperature of the clutch actuator 1, a temperature sensor (not shown here) can be used.

The clutch actuator 1 is actuated and moved to the left in the plane of the figure, when from an aft supply system (not shown) of a motor vehicle compressed air is supplied to a pressure chamber 4 between the piston 2 and the cylinder 3.

When the clutch actuator 1 is not actuated, the shifting and/or starting clutch arranged between the drive aggregate and the transmission is closed. If the temperature falls below a glass transition temperature of the sealing elements 6, 7, these and therefore the clutch actuator 1 as well are no longer leakproof and the starting and/or shifting clutch cannot be opened by the clutch actuator 1, or only incompletely so. To warm up the clutch actuator 1 the drive aggregate of the motor vehicle then has to be operated at an idling rotational speed for a longer time. During this, the release bearing 8 lightly prestressed by the spring 5 is warmed by the waste heat emitted. Indirectly, therefore, the piston 2 and the sealing elements 6, 7 are also warmed. As soon as the sealing elements 6, 7 reach a temperature above the glass transition temperature of the sealing elements 6, 7, the sealing elements fulfill their sealing function and the clutch actuator 1 is ready to operate. Since the gradient at which the temperature of the sealing elements 6, 7 rises is very shallow, at low temperatures the warm-up process can take a correspondingly long time. For the driver of the vehicle this results in unacceptably long waiting times.

According to the invention, it is therefore provided that the drive aggregate is operated at a rotational speed higher compared with the idling speed of the drive aggregate, when a temperature of the clutch actuator 1 is lower than a glass transition temperature of the at least one sealing element 6, 7. This actively influences the warming-up process and the warming of the pneumatic sealing elements 6, 7 to above their glass transition temperature can be made much quicker.

The higher the rotational speed at which the drive aggregate and consequently also the pressure plate 11 of the shifting and/or starting clutch in contact with the release bearing 8 are operated, the more rapidly is the release bearing 8 prestressed by the spring 5 warmed up by the waste heat given off. The clutch actuator 1, and thus also the transmission and the motor vehicle, are therefore ready for operation at an earlier time.

If the clutch actuator 1 is already being acted upon with compressed air from the air supply system when the temperature of the clutch actuator 1 is lower than a glass transition temperature of the at least one sealing element 6, 7, the warming up process of the clutch actuator can be accelerated further.

By acting upon the pressure chamber 4 with pressure, despite the imperfectly leakproof condition the piston 2 of the clutch actuator 1 undergoes an axial movement in the direction toward the pressure plate 11 of the shifting and/or starting clutch. This increases the load acting on the release bearing 8. Since the drive aggregate is already being operated at an elevated rotational speed, the pressure plate 11 of the shifting and/or starting clutch also rotates at the elevated speed of the drive aggregate. Due to the higher load on the release bearing 8 and the elevated rotational speed of the drive aggregate the release bearing 8 consequently warms up more quickly, and along with the release bearing 8 so too do the piston 2 and the sealing elements 6, 7 arranged between the piston 2 and the cylinder 3, and the piston 2 and the guide-tube 12.

Alternatively or in addition to the detection of the temperature of the clutch actuator 1 by a temperature sensor, the temperature of the clutch actuator 1 or the temperature of the piston 2 of the clutch actuator 1 can also be determined. Since the load acting on the release bearing 8 is proportional to the release path that can be covered by the piston 2 due to the action of pressure, by virtue of path signals picked up by the path sensor 10 the load acting on the release bearing 8 can be deduced. From the known load on the release bearing 8 a temperature gradient can be determined, with which the piston 2 of the clutch actuator 1 warms up. Finally, by integrating the temperature gradient produced over time in each case, the warming behavior of the piston 2 of the clutch actuator 1 and therefore the temperature of the piston 2 and the temperature of the sealing elements 6, 7 can be deduced.

Figure 2:
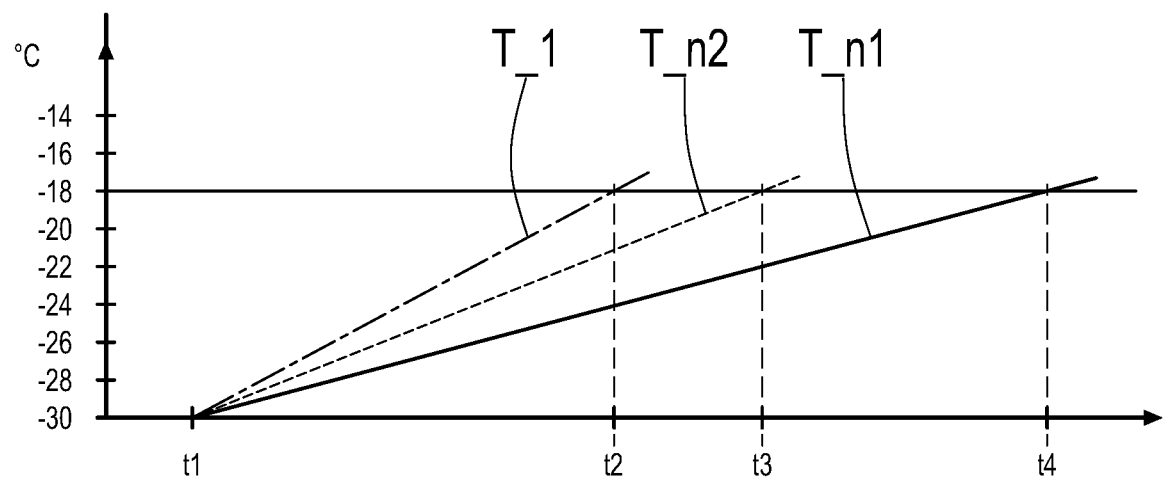
FIG. 2: A diagram in which temperature variations of the clutch actuator are shown as a function of time.

FIG. 2 shows a schematic diagram in which temperature variations of the clutch actuator 1 are shown as a function of time. The temperature in ° C. is plotted along the ordinate and the time t along the abscissa. As examples, temperature variations are shown which are produced at the piston 2 of the clutch actuator 1 during a warm-up phase of the transmission or the motor vehicle. When the temperature is below a glass transition temperature of the sealing elements 6, 7, which is indicated in this case as around −18° C., the sealing elements and thus also the clutch actuator are not leakproof and the starting and/or shifting clutch cannot be opened by means of the clutch actuator 1, or only incompletely so. Only when the glass transition temperature has been reached or exceeded can the sealing elements 6, 7 and therefore also the clutch actuator 1 be operated again. In this example a warm-up phase is started at time t1 at an assumed temperature of −30° C.

The continuous line T_n1 shows a time variation of the temperature of the piston 2 of the clutch actuator 1 during a warm-up phase in which the drive aggregate is operated at an idling speed, for example of 600 r/min, and the clutch actuator 1 is not acted upon by compressed air. The gradient with which the temperature of the piston increases is very shallow, such that the glass transition temperature is not reached until a time t4 and the warming-up process takes a correspondingly long time.

The broken line T_n2 shows a time variation of the temperature of the piston 2 of the clutch actuator 1 during a warm-up phase in which the drive aggregate is operated at a rotational speed higher compared with the idling speed of the drive aggregate but the clutch actuator 1 is again not acted upon by compressed air. In this case, for example, the drive aggregate can be operated at a rotational speed of 850 r/min. Since the warm-up process is actively influenced by the elevated rotational speed of the drive aggregate, warming of the piston 2 of the clutch actuator 1 to a temperature above the glass transition temperature can be substantially accelerated. In this case the glass transition temperature is reached already after a time t3.

The dot-dash line T_1 shows a time variation of the temperature of the piston 2 of the clutch actuator 1 during a warm-up phase in which, in addition to the elevation of the rotational speed of the drive aggregate, the clutch actuator 1 is also acted upon by compressed air from the air supply system. This can further accelerate the warming-up process of the clutch actuator, so that the glass transition temperature is already reached at an earlier time t2.

INDEXES

1 Actuation means, clutch actuator
2 Piston
3 Cylinder
4 Pressure chamber
5 Pre-load spring
6 Outer sealing element
7 Inner sealing element
8 Release bearing
9 Rotational axis
10 Path sensor
11 Pressure plate
12 Guide-tube

The invention claimed is:

1. A method for warming up a pneumatic clutch actuator of a transmission having at least one sealing element arranged between two elements of the clutch actuator that are moveable relative to one another, the method comprising:
    within a specifiable operating temperature range in which leakproofness of the clutch actuator is ensured, acting upon the clutch actuator with compressed air from an air supply system for actuation of a shifting and a starting clutch arranged between a drive aggregate and a transmission, and
    if a temperature of the clutch actuator is lower than a glass transition temperature of the at least one sealing element, operating the drive aggregate at a rotational speed compared with an idling speed of the drive aggregate.

2. The method according to claim 1, further comprising operating the drive aggregate at a maximum permissible rotational speed, with respect to a temperature of the drive aggregate.

3. The method according to claim 1, further comprising reducing the rotational speed of the drive aggregate when either the temperature of the clutch actuator or a temperature of the at least one sealing element, arranged between the two elements of the clutch actuator that move relative to one another, exceeds the glass transition temperature.

4. The method according to claim 1, further comprising, if the temperature of the clutch actuator is lower than the glass transition temperature of the at least one sealing element, acting upon the clutch actuator with compressed air from the air supply system.

5. The method according to claim 4, further comprising preheating the compressed air supplied to the clutch actuator by a through-flow heater arranged in the air supply system.

6. The method according to claim 4, further comprising discontinuing the supply of compressed air from the air supply system, when the temperature of either the clutch actuator or the at least one sealing element, arranged between the two elements of the actuator that move relative to one another, exceeds the glass transition temperature.

7. The method according to claim 4, further comprising discontinuing the supply of compressed air from the air supply system when a maximum permissible switched-on time of an electro-pneumatic switching valve of the air supply system is reached.

8. The method according to claim 1, further comprising deducing a degree of leakproofness of either the clutch actuator or the sealing element with reference to a pulse frequency at which inlet valves of the air supply system are controlled in order to actuate the clutch actuator, and a determined position of the clutch actuator while the clutch actuator is being acted upon by pressure.

9. A control unit designed to carry out the method for warming up a pneumatic clutch actuator according to claim 1.

10. A computer program product with program code modules stored on a computer-readable data carrier, for carrying out the method according to claim 1 when the computer program product is run on a computer or an appropriate computer unit of a control unit of the pneumatic clutch actuator.

* * * * *